United States Patent
Ichikawa (10) Patent No.: US 10,241,436 B1
(45) Date of Patent: Mar. 26, 2019

(54) IMAGE FORMING APPARATUS AND LASER LIGHT DETECTING METHOD

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Masaki Ichikawa, Mishima Shizuoka (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/712,586

(22) Filed: Sep. 22, 2017

(51) Int. Cl.
*B41J 2/47* (2006.01)
*G03G 15/04* (2006.01)
*G02B 26/12* (2006.01)
*G03G 15/043* (2006.01)
*H04N 1/40* (2006.01)

(52) U.S. Cl.
CPC ..... *G03G 15/04072* (2013.01); *G02B 26/127* (2013.01); *G03G 15/043* (2013.01); *H04N 1/40037* (2013.01)

(58) Field of Classification Search
CPC ..... B41J 2/442; B41J 2/45; B41J 2/451; B41J 2/455; B41J 2/47; B41J 2/471; B41J 2/473; G03G 15/04072; G03G 15/043; G02B 26/127
See application file for complete search history.

(56) References Cited

U.S. PATENT DOCUMENTS

| 5,883,385 A | 3/1999 | Takahashi et al. |
| 2009/0251755 A1* | 10/2009 | Oda ............... G03G 15/043 359/216.1 |
| 2014/0218455 A1 | 8/2014 | Ichikawa |

FOREIGN PATENT DOCUMENTS

| JP | 06-225084 | 8/1994 |
| JP | 2001-353897 | 12/2001 |
| JP | 2003-305884 | 10/2003 |
| JP | 2016-179553 | 10/2016 |

* cited by examiner

*Primary Examiner* — Geoffrey S Mruk
*Assistant Examiner* — Scott A Richmond
(74) *Attorney, Agent, or Firm* — Amin, Turocy & Watson LLP (57) ABSTRACT

An image forming apparatus includes a laser device, a sensor, and a control unit. The laser device emits laser light which is reference for image forming. The sensor detects the laser light emitted from the laser device. The control unit changes an output direction of the laser light emitted from the laser device if the laser light is not detected by the sensor.

11 Claims, 7 Drawing Sheets

| NUMBER OF ANGLE CHANGES | TILT MOTOR ROTATION INFORMATION |
|---|---|
| 0 | OO (DIRECTION OF (2)) |
| 1 | XX (DIRECTION OF (3)) |
| ⋮ | ⋮ |

IMAGE FORMING APPARATUS AND LASER LIGHT DETECTING METHOD

FIELD

Embodiments described herein relate generally to an image forming apparatus and a laser light detecting method.

BACKGROUND

An image forming apparatus stops operation if a specific laser light, which is reference when a laser emits light, cannot be detected.

In the apparatus, user convenience aggravates in some cases.

DETAILED DESCRIPTION

An image forming apparatus of an embodiment has a laser device, a sensor, and a control unit. The laser device emits laser light which is reference for image forming. The sensor detects the laser light emitted from the laser device. The control unit changes an output direction of the laser light emitted from the laser device if the laser light is not detected by the sensor.

Hereinafter, the image forming apparatus and a laser light detecting method of the embodiment will be described with reference to the drawings.

Figure 1:
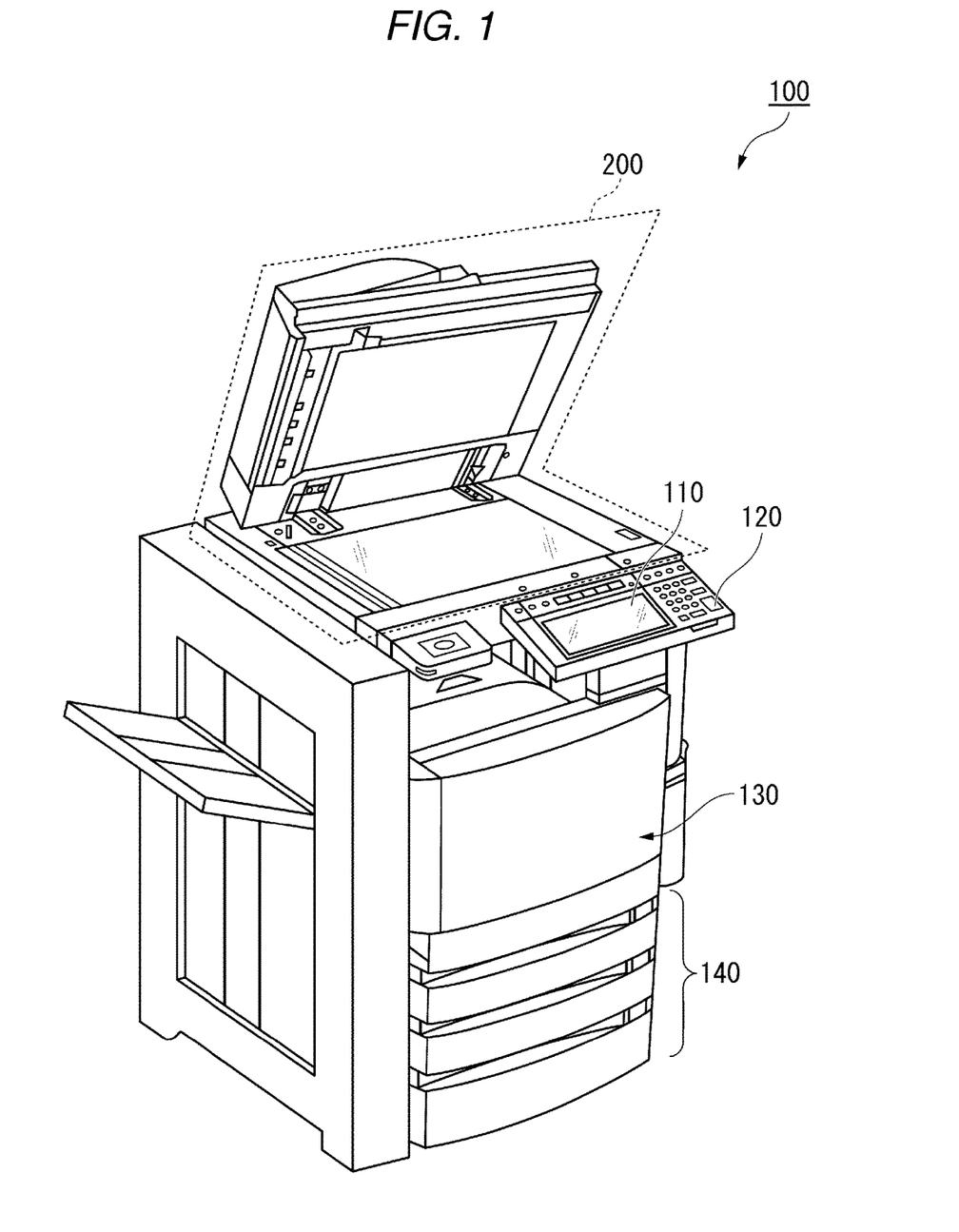
FIG. 1 is an external view illustrating an overall configuration example of an image forming apparatus of an embodiment.

FIG. 1 is an external view illustrating an overall configuration example of an image forming apparatus 100 of the embodiment.

The image forming apparatus 100 of the embodiment is a multi function peripheral (MFP) capable of forming an image onto a sheet with a toner. The sheet is, for example, paper where original documents, characters, and images are printed. The sheet may be any sheet insofar as the sheet can be read by the image forming apparatus 100. The image forming apparatus 100 generates digital data by reading an image printed on a sheet and generates an image file.

The image forming apparatus 100 includes a display 110, a control panel 120, a printer unit 130, a sheet accommodating unit 140, and an image reading unit 200. The printer unit 130 of the image forming apparatus 100 fixes an image with a toner.

The display 110 is an image display device such as a liquid crystal display and an organic electroluminescent (EL) display. The display 110 displays a variety of types of information related to the image forming apparatus 100. The display 110 outputs a signal corresponding to operation performed by a user to a processor of the image forming apparatus 100. In addition, the display 110 receives operation by the user.

The control panel 120 has a plurality of buttons. The control panel 120 receives operation by the user. The control panel 120 outputs a signal corresponding to operation performed by the user to the processor of the image forming apparatus 100. The display 110 and the control panel 120 may be integrated so as to be configured as a touch panel.

The printer unit 130 executes image forming. In image forming, the printer unit 130 forms an image onto a sheet based on image information generated by the image reading unit 200 or image information received via a communication path. The printer unit 130 forms an image onto a sheet using a plurality of colors of (a color Y, a color M, a color C, and a color K) toners.

The sheet accommodating unit 140 accommodates sheets used when the printer unit 130 forms an image.

The image reading unit 200 reads an image, which is a reading target, as light and shade. For example, the image reading unit 200 reads an image printed on the sheet, which is a reading target. The image reading unit 200 records read image data. The recorded image data may be transmitted to other information processing devices via a network. The recorded image data may be formed onto a sheet by the printer unit 130.

Figure 2:
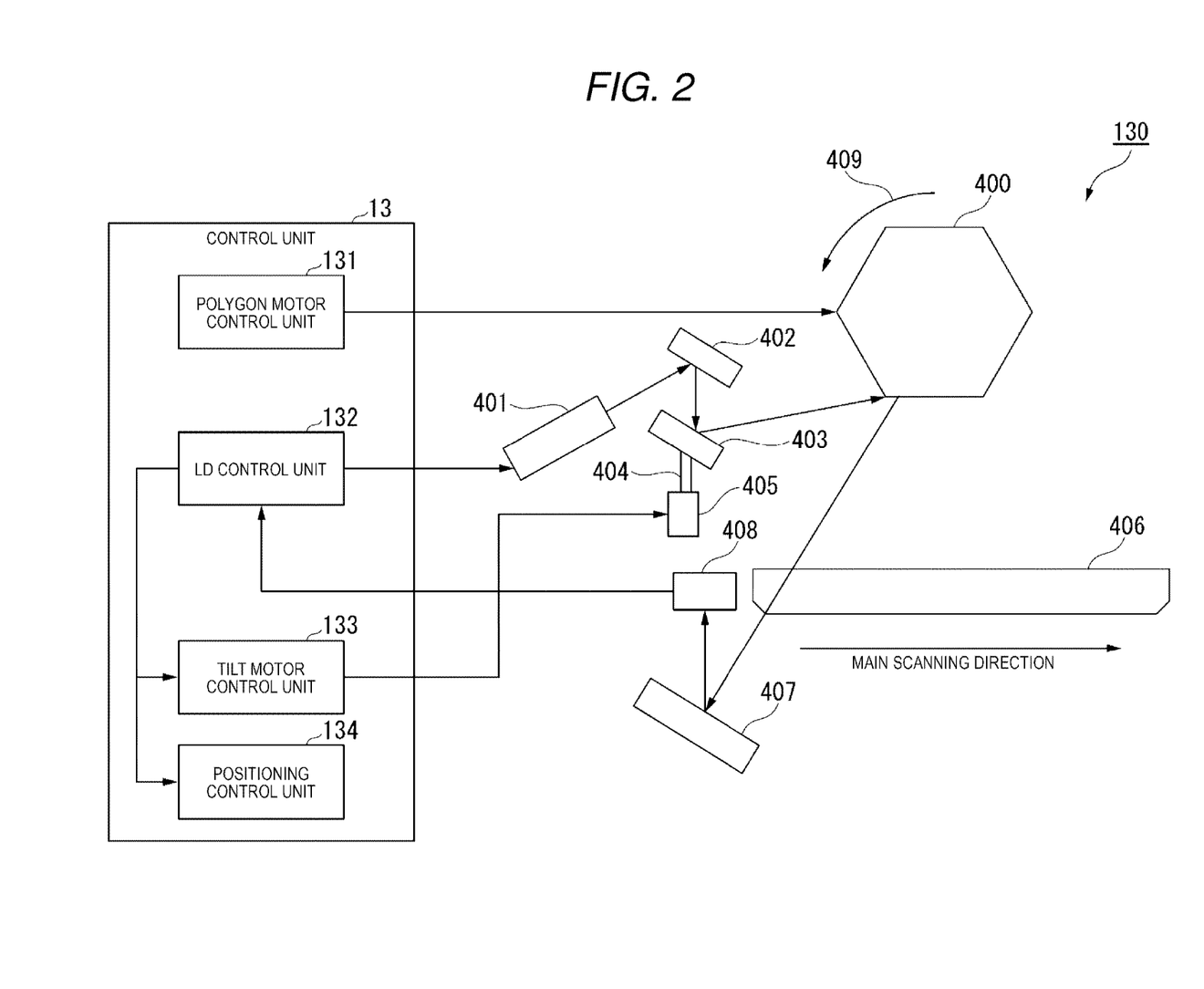
FIG. 2 is a view illustrating a specific configuration of a printer unit.

Next, a configuration of the printer unit 130 will be described with reference to FIG. 2. FIG. 2 illustrates a specific configuration of the printer unit 130. As illustrated in FIG. 2, the printer unit 130 includes a control unit 13, a polygon mirror 400, a laser diode (LD) 401, a mirror 402, a tilt mirror 403, a coupling shaft 404, a tilt motor 405, an fθ lens 406, a mirror 407, and a beam detecting (BD) sensor 408. The control unit 13 may be a processor 300 to be described later, or may be configured so as to additionally include another central processing unit (CPU), which is different from the processor 300. The control unit 13 includes a polygon motor control unit 131, a LD control unit 132, a tilt motor control unit 133, and a positioning control unit 134. In addition, the polygon mirror 400, the LD 401, the mirror 402, the tilt mirror 403, the coupling shaft 404, the tilt motor 405, the fθ lens 406, the mirror 407, and the BD sensor 408 are configured as an exposure device.

The polygon motor control unit 131 is electrically connected to a polygon motor that rotation-drives the polygon mirror 400 according to a printing instruction from the processor.

The LD control unit 132 controls the LD 401. For example, the LD control unit 132 controls timing when laser light is emitted by the LD 401. The LD control unit 132 causes the tilt motor control unit 133 to change the angle of the tilt mirror 403 if laser light from a light source, which is reference for image forming, cannot be detected. In addition, the LD control unit 132 switches between different colors of light sources of the LD 401 if laser light cannot be detected in all light sources of the LD 401, which are in a certain color. There are the plurality of colors (the color Y, the color M, the color C, and the color K) of light sources of the LD 401. In addition, if laser light from a light source, which is reference for image forming, cannot be detected, the LD control unit 132 changes the light source, which is the reference when forming an image.

In accordance with an instruction from the LD control unit 132, the tilt motor control unit 133 drives the tilt motor 405 to change the angle of the tilt mirror 403.

The positioning control unit 134 executes positioning control based on laser light detected by the BD sensor 408. Positioning control includes, for example, skew correction with respect to a reference color, sub-scanning position correction with respect to a reference color, main scanning magnification correction with respect to a reference color, and main scanning position correction with respect to a reference color.

The polygon mirror 400 has a plurality of reflection surfaces. Although a case where the polygon mirror 400 has six surfaces is described as an example in the embodiment, the polygon mirror 400 may have any number of surfaces insofar as the polygon mirror has a plurality of surfaces. The number of surfaces of the polygon mirror 400 may be determined according to parameters, such as a printing speed and resolution. For example, the polygon mirror 400 rotates in a direction of an arrow 409 (counterclockwise) in response to the driving of the polygon motor.

Figure 3:
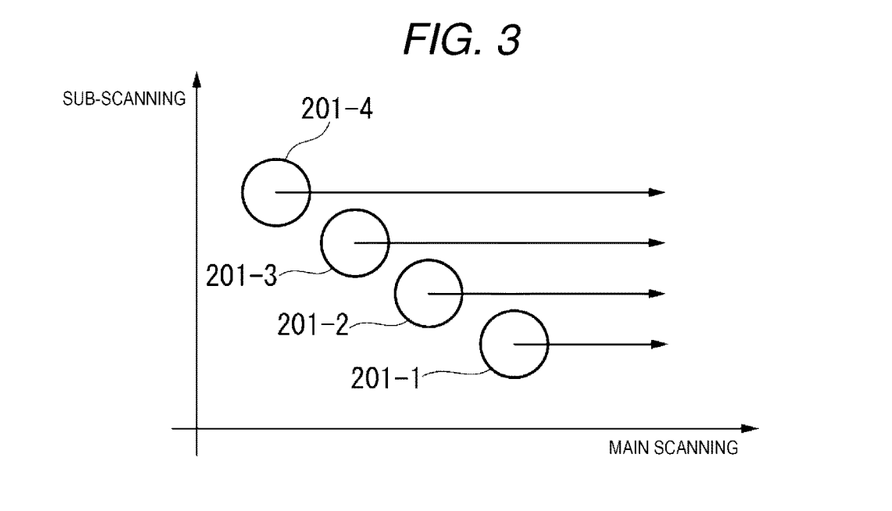
FIG. 3 illustrates a disposition example of a plurality of light sources.

The LD 401 emits laser light at timing in accordance with control by the LD control unit 132. The LD 401 includes a plurality of light sources for each color of laser light. Specifically, the LD 401 includes a plurality of light sources with respect to the color Y, a plurality of light sources with respect to the color M, a plurality of light sources with respect to the color C, and a plurality of light sources with respect to the color K. FIG. 3 shows a disposition example of a plurality of light sources. As shown in FIG. 3, a plurality of light sources with respect to each color are arrayed in a first light source 201-1, a second light source 201-2, a third light source 201-3, and a fourth light source 201-4. Each of the plurality of light sources is disposed so as to have a different irradiation distance in a main scanning direction. Although a case where there are four light sources with respect to each color is described as an example in FIG. 3, there may be three or less light sources, or there may be five or more light sources. A case where the LD 401 includes the plurality of light sources (four light sources) with respect to each color (for example, four colors), that is 16 sources of laser light, is described as an example in the embodiment.

The mirror 402 reflects laser light emitted from the LD 401. The mirror 402 is disposed at a position fixed in advance. For example, the mirror 402 is disposed at a position which allows the tilt mirror 403 to reflect laser light emitted from the LD 401.

The tilt mirror 403 reflects laser light. The tilt mirror 403 is disposed at a position fixed in advance. For example, the tilt mirror 403 is disposed at a position which allows the polygon mirror 400 to reflect laser light reflected from the mirror 402. Laser light reflected by the tilt mirror 403 is reflected as reflected light that continuously changes an angle thereof on the reflection surface when the polygon mirror 400 rotates. In addition, the tilt mirror 403 is used in order to correct a skew shift with respect to a reference color.

The coupling shaft 404 couples the tilt mirror 403 and the tilt motor 405 together and is a rotation shaft that changes the angle of the tilt mirror 403 when the tilt motor 405 rotates.

The tilt motor 405 is rotation-driven in accordance with control by the tilt motor control unit 133. By rotation-driving the tilt motor 405, the angle of the tilt mirror 403 is changed in a direction corresponding to a rotation direction of the tilt motor 405.

The fθ lens 406 scans laser light reflected by the polygon mirror 400 at a constant speed on an image plane.

The mirror 407 reflects laser light reflected by the polygon mirror 400. The mirror 407 is disposed such that the BD sensor 408 reflects the laser light.

The BD sensor 408 detects laser light reflected by the mirror 407 as a BD signal. When laser light is detected, the BD sensor 408 outputs a notification of the detection of the laser light to the LD control unit 132. The laser light detected by the BD sensor 408 is used as a main scanning direction scanning initiation reference signal, and is in synchronization with a writing initiation position in the main scanning direction of each line with the laser light as reference.

Figure 4:
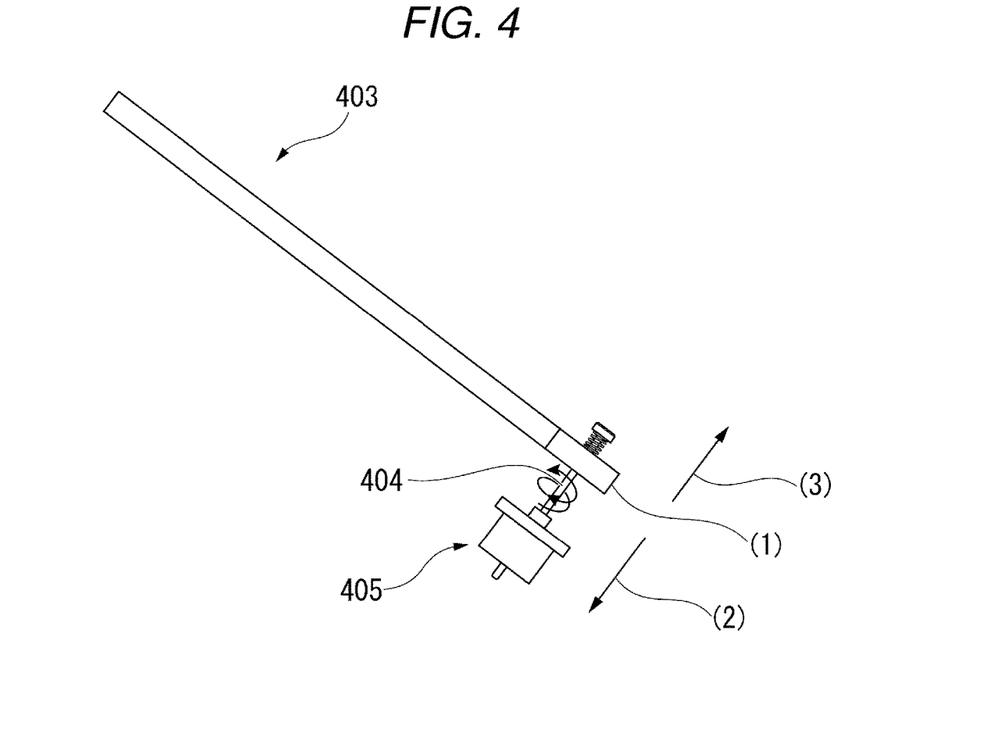
FIG. 4 illustrates a configuration example of a tilt mirror, a coupling shaft, and a tilt motor.

FIG. 4 illustrates a configuration example of the tilt mirror 403, the coupling shaft 404, and the tilt motor 405. As illustrated in FIG. 4, if the tilt motor 405 does not rotate, the tilt mirror 403 is at an angle in an initial state indicated with (1). By the tilt motor 405 being rotation-driven, the tilt mirror 403 moves in a direction indicated with (2) or (3), and the angle of the tilt mirror 403 changes.

Figure 5:
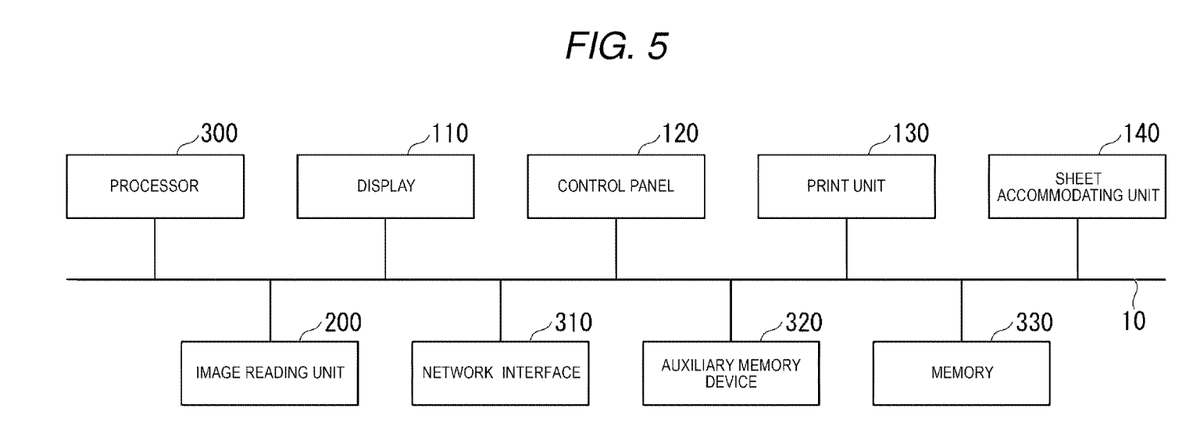
FIG. 5 is a block diagram showing a hardware configuration of the image forming apparatus.

FIG. 5 is a block diagram showing a hardware configuration of the image forming apparatus 100.

As shown in FIG. 5, the image forming apparatus 100 includes the display 110, the control panel 120, the printer unit 130, the sheet accommodating unit 140, the image reading unit 200, the processor 300, a network interface 310, an auxiliary memory device 320, and a memory 330. The description on the display 110, the control panel 120, the printer unit 130, the sheet accommodating unit 140, and the image reading unit 200 will be omitted as the units are described above. Hereinafter, the processor 300, the network interface 310, the auxiliary memory device 320, and the memory 330 will be described. Functional units are connected to each other so as to be capable of data communication via a system bus 10.

The processor 300 is, for example, a CPU. The processor 300 controls the operation of each functional unit of the image forming apparatus 100. The processor 300 executes various types of processing by executing a program. When a printing execution instruction is received, the processor 300 outputs the printing execution instruction to the printer unit 130.

The network interface 310 transmits and receives data to and from other devices. Herein, other devices mean image processing devices, for example, personal computers. The network interface 310 operates as an input interface, and receives data or an instruction transmitted from other devices. An instruction transmitted from other devices includes a printing execution instruction. In addition, the network interface 310 operates as an output interface, and transmits data to other devices.

The auxiliary memory device 320 is, for example, a hard disk or a solid state drive (SSD), and stores various types of data. The various types of data include a changed angle information table, digital data, abnormality information, a job, and a job log. The changed angle information table is used when changing the angle of the tilt mirror 403. The digital data is image information generated by the image reading unit 200. The abnormality information indicates a change in an output direction of laser light. A change in the output direction of laser light includes a change of a light source and a change in the angle of the tilt mirror 403.

The memory 330 is, for example, a random access memory (RAM). The memory 330 temporarily stores data used by each functional unit included in the image forming apparatus 100. The memory 330 may store digital data generated by the image reading unit 200. The memory 330 may temporarily store any one of or all of a changed angle information table, digital data, abnormality information, a job, and a job log.

Figure 6:
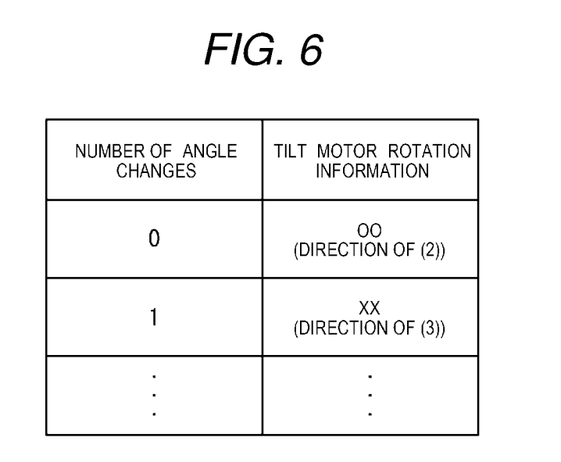
FIG. 6 illustrates a specific example of a changed angle information table.

FIG. 6 shows a specific example of the changed angle information table. As shown in FIG. 6, the number of angle changes and tilt motor rotation information are registered in the changed angle information table. The number of angle changes indicates the number of times the angle of the tilt mirror 403 is changed. Instead of a total number of times the angle is changed, the number of angle changes means the number of times the angle is changed for each light source. The tilt motor rotation information indicates a rotation direction of the tilt motor according to the number of angle changes.

In an example shown in FIG. 6, a plurality of numbers of angle changes are registered in the changed angle information table. The numbers of angle changes are "0" and "1". In FIG. 6, a record registered in the uppermost row of the changed angle information table shows that the value of the number of angle changes is "0", and the value of tilt motor rotation information is "OO (direction of (2))". That is, if the number of angle changes is 0, the tilt motor 405 is rotated such that the tilt mirror 403 moves in the direction of (2) illustrated in FIG. 4.

In addition, in FIG. 6, a record registered in the second highest row in the changed angle information table shows that the value of the number of angle changes is "1", and the value of tilt motor rotation information is "XX (direction of (3))". That is, if the number of angle changes is 1, the tilt motor 405 is rotated such that the tilt mirror 403 moves in the direction of (3) illustrated in FIG. 4.

As described above, the tilt motor control unit 133 in the embodiment changes the angle of the tilt mirror 403 two times for one light source in one color.

Figure 7:
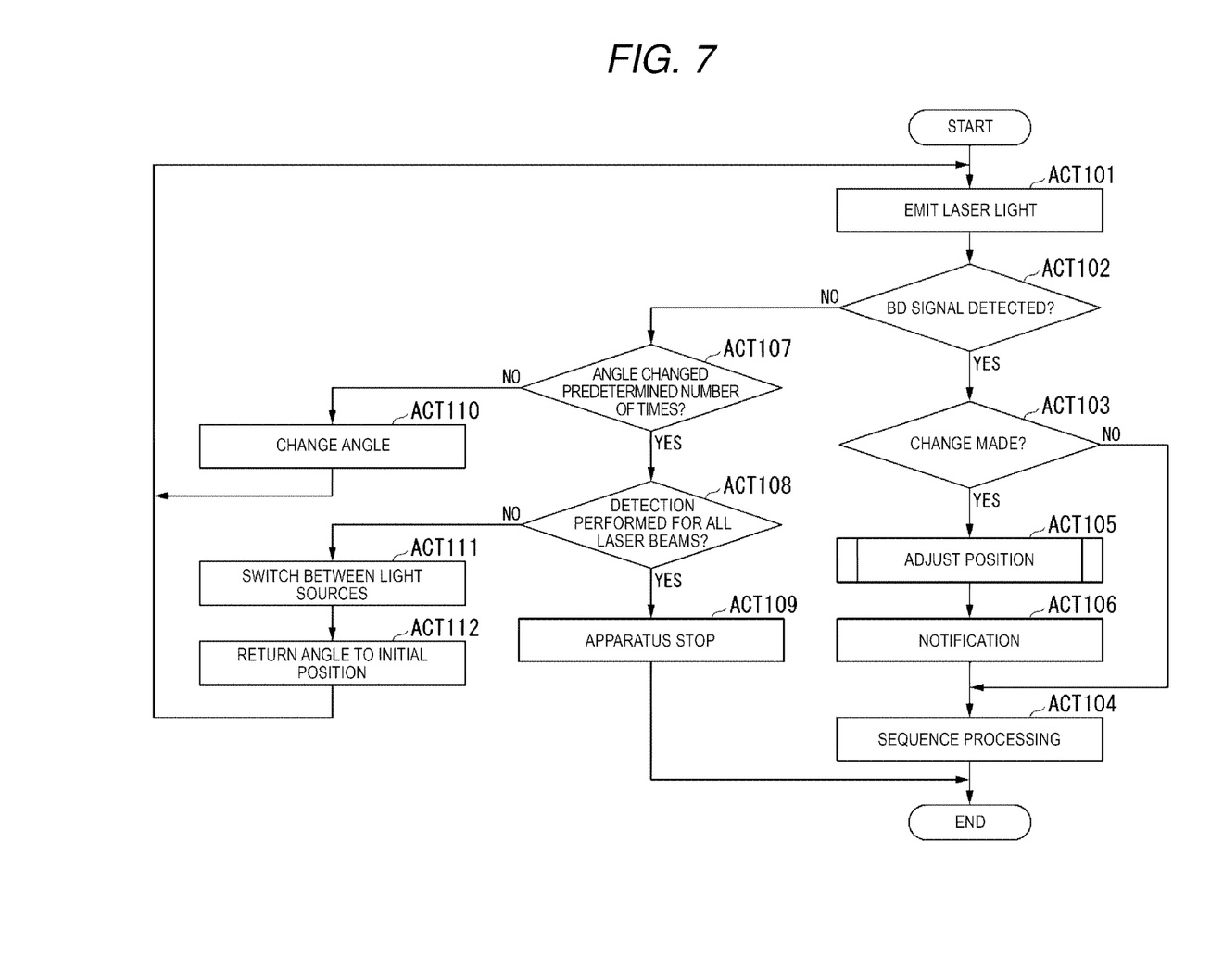
FIG. 7 is a flow chart showing flow of processing of the image forming apparatus.

FIG. 7 is a flow chart showing the flow of processing of the image forming apparatus 100. The processing of FIG. 7 is executed at timing when a printing instruction is given. When initiating the processing of FIG. 7, a light source, which is reference for image forming, is the first light source 201-1 in the color Y.

The LD control unit 132 controls the LD 401 to emit laser light from the first light source 201-1 in the color Y. The LD 401 emits laser light from the first light source 201-1 in the color Y in accordance with control by the LD control unit 132 (ACT 101). The LD control unit 132 determines whether or not a BD signal is detected (ACT 102). The determination on whether or not a BD signal is detected is made according to whether or not laser light is detected by the BD sensor 408. If laser light is detected by the BD sensor 408, the LD control unit 132 determines that a BD signal is detected. A case where laser light is detected corresponds to a case where a notification that laser light is detected within a predetermined time from a time point when the LD control unit 132 gives an irradiation instruction is obtained.

On the other hand, if laser light is not detected by the BD sensor 408, the LD control unit 132 determines that a BD signal is not detected. A case where laser light is not detected corresponds to a case where a notification that laser light is detected within a predetermined time from a time point when the LD control unit 132 gives an irradiation instruction is not obtained.

If a BD signal is detected (ACT 102: YES), the LD control unit 132 determines whether or not a change is made (ACT 103). Specifically, the LD control unit 132 determines that any one of or both of a change in the angle of the tilt mirror 403 and a change of a light source are made. If a change is not made (ACT 103: NO), the printer unit 130 executes sequence processing (ACT 104). Herein, the sequence processing is a normal printing.

On the other hand, if a change is made (ACT 103: YES), the LD control unit 132 notifies the positioning control unit 134 that a change is made. When the notification is received from the LD control unit 132, the positioning control unit 134 adjusts a position (ACT 105). Specific processing of position adjusting will be described later. After then, the LD control unit 132 saves information related to a point where a change is made as abnormality information in the auxiliary memory device 320. Examples of the information related to a point where a change is made include information indicating that a change of a light source is made and information indicating that the angle of the tilt mirror 403 is changed. In addition, the LD control unit 132 transmits the information related to a point where a change is made as abnormality information to an external device via the network interface 310 (ACT 106). After then, the image forming apparatus 100 performs processing of ACT 104.

If a BD signal is not detected in processing of ACT 102 (ACT 102: NO), the LD control unit 132 determines whether or not the angle is changed a predetermined number of times (ACT 107). Specifically, the LD control unit 132 determines whether or not the angle of the tilt mirror 403 is changed a predetermined number of times for one light source in one color. For example, the LD control unit 132 determines whether or not the angle of the tilt mirror 403 is changed a predetermined number of times for the first light source 201-1 in the color Y. The predetermined number of times described herein is, for example, the number of times registered in the changed angle information table. The LD control unit 132 determines whether or not the angle of the tilt mirror 403 is changed two times for the first light source 201-1 of the color Y.

If the angle is changed a predetermined number of times (ACT 107: YES), the LD control unit 132 determines whether or not the detection of a BD signal is performed for all laser light beams (ACT 108). Herein, all laser light beams mean laser light beams from all colors of light sources (16 light sources in the embodiment). If the detection of a BD signal is performed for all the laser light beams (ACT 108: YES), the LD control unit 132 outputs a notification that a BD signal is not detected to the processor 300. When the notification that a BD signal is not detected is acquired from the LD control unit 132, the processor 300 stops printing operation of the image forming apparatus 100 (ACT 109). After then, the image forming apparatus 100 terminates processing.

If the angle is not changed a predetermined number of times in the processing of ACT 107 (ACT 107: NO), the LD control unit 132 instructs the tilt motor control unit 133 to change the angle of the tilt mirror 403. The tilt motor control unit 133 changes the angle of the tilt mirror 403 in accordance with the instruction from the LD control unit 132 (ACT 110). Specifically, first, the tilt motor control unit 133 reads the changed angle information table from the auxiliary memory device 320. Next, the tilt motor control unit 133 selects a corresponding record out of records of the number of angle changes in the read changed angle information table. For example, the tilt motor control unit 133 selects a record corresponding to the number of times the angle of the tilt mirror 403 is changed for a light source used at a current time point. If the number of times the angle of the tilt mirror 403 is changed for the light source used at a current time point is 0, the tilt motor control unit 133 selects a record corresponding to the number of angle changes "0". In addition, if the number of times the angle of the tilt mirror 403 is changed for a light source used at a current time point is 1, the tilt motor control unit 133 selects a record corresponding to the number of angle changes "1". The tilt motor control unit 133 causes the tilt motor 405 to be rotation-driven in a direction indicated by information registered in a tilt motor rotation information entry of the selected record. Consequently, the angle of the tilt mirror 403 is changed. After then, the image forming apparatus 100 executes processing after ACT 101.

If the detection of a BD signal is not performed for all laser light beams in processing of ACT 108 (ACT 108: NO), the LD control unit 132 switches between sources of laser light (ACT 111). Specifically, the LD control unit 132 switches from a source of laser light which is being used at a current time point to another light source to become an irradiation source of laser light. For example, if a light source which is being used at a current time point is the first light source 201-1 in a certain color, the LD control unit 132 switches to the second light source 201-2 in the color. For example, if a light source which is being used at a current time point is the first light source 201-1 in the color Y, the LD control unit 132 switches to the second light source 201-2 in the color Y.

If a light source which is being used at a current time point is the second light source 201-2 in a certain color, the LD control unit 132 switches to the third light source 201-3 in the color. If a light source which is being used at a current time point is the third light source 201-3 in a certain color, the LD control unit 132 switches to the fourth light source 201-4 in the color. In addition, if a light source which is being used at a current time point is the fourth light source 201-4 in a certain color, the LD control unit 132 switches to the first light source 201-1 in a different color.

As described above, if the LD control unit 132 cannot detect a BD signal, switching between all light sources in one color are performed first. Then, if a BD signal cannot be detected with all light sources in a certain color, the LD control unit 132 switches to a light source in a different color and performs the detection of a BD signal. After then, the LD control unit 132 outputs an instruction to return the angle of the tilt mirror 403 to an initial position to the tilt motor control unit 133. The tilt motor control unit 133 returns the tilt mirror 403 to the initial position (position of (1) illustrated in FIG. 4) in accordance with the instruction from the LD control unit 132 (ACT 112).

Figure 8:
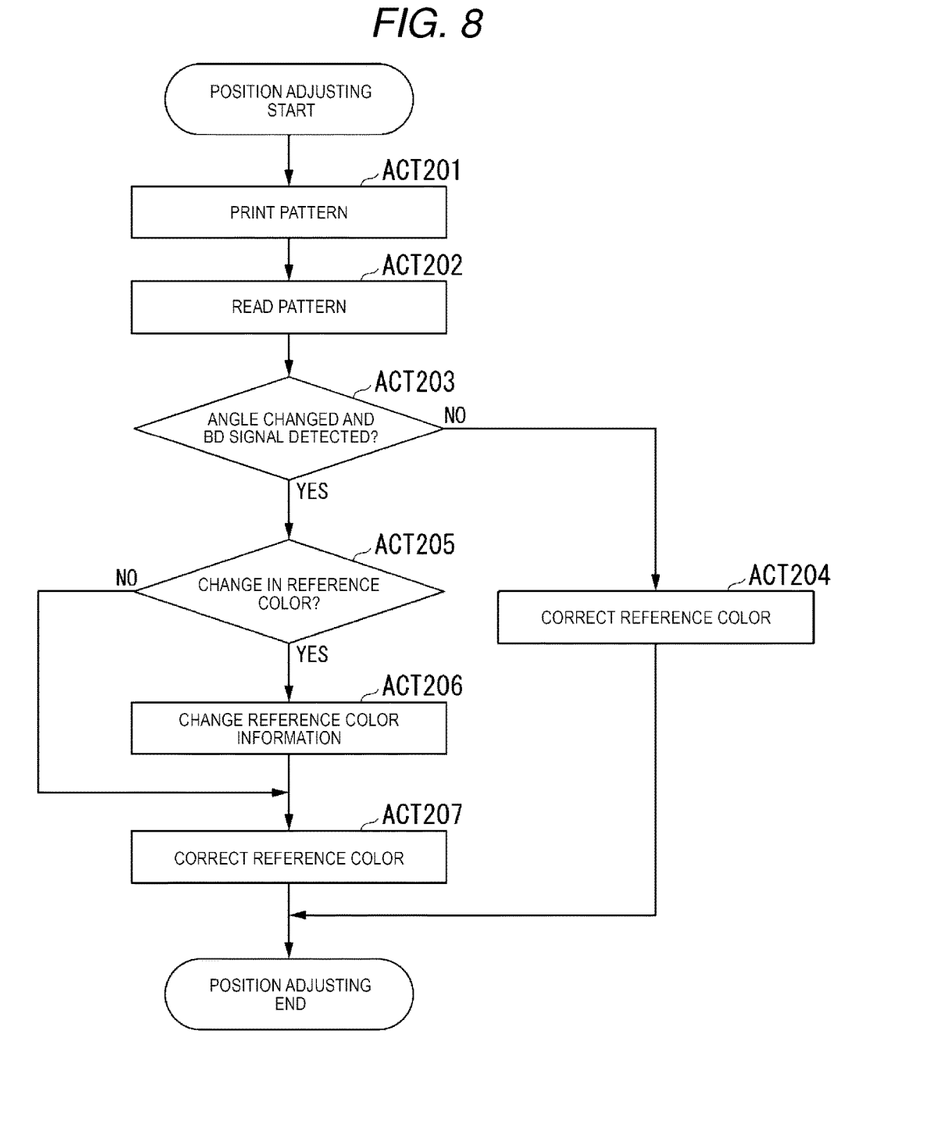
FIG. 8 is a flow chart showing flow of position adjusting performed by the image forming apparatus.

FIG. 8 is a flow chart showing the flow of position adjusting performed by the image forming apparatus 100.

The positioning control unit 134 prints a test pattern onto a transfer belt (not illustrated) (ACT 201). The test pattern formed on the transfer belt is read by a reflective optical sensor (not illustrated) (ACT 202). The positioning control unit 134 changes the angle of the tilt mirror 403 and determines whether or not a BD signal is detected (ACT 203). If the angle is changed and a BD signal is not detected (ACT 203: NO), the positioning control unit 134 corrects a reference color (ACT 204). The reference color is set in advance. Herein, correction performed by the positioning control unit 134 includes skew correction, sub-scanning position correction, main scanning magnification correction, and main scanning position correction with respect to the reference color. For example, the positioning control unit 134 measures a shift amount in the main scanning direction and a sub-scanning direction based on the read test pattern. Then, the positioning control unit 134 executes positioning based on the measured shift amount. For example, the positioning control unit 134 changes an image position in main scanning and sub-scanning and image magnification in main scanning based on the shift amount.

If the angle is changed and a BD signal is detected (ACT 203: YES), the positioning control unit 134 determines whether or not there is a change in the reference color (ACT 205). The determination of whether or not there is a change in the reference color is made according to whether or not the color of a light source used when a BD signal is detected is the reference color. If the color of a light source used when a BD signal is detected is the reference color, the positioning control unit 134 determines that there is no change in the reference color. On the other hand, if the color of a light source used when a BD signal is detected is not the reference color, the positioning control unit 134 determines that there is a change in the reference color.

If there is a change in the reference color (ACT 205: YES), the positioning control unit 134 changes reference color information (ACT 206). Herein, the reference color information indicates a reference color. The reference color information is used as information indicating a reference color used in detecting a BD signal. That is, when a printing instruction is given, the LD control unit 132 determines a light source from which light is to be emitted first based on the reference color information. If a reference color indicated by the reference color information is the color Y, the LD control unit 132 first causes the first light source 201-1 in the color Y to emit laser light when a printing instruction is given.

After then, the positioning control unit 134 corrects the reference color (ACT 207). Herein, correction performed by the positioning control unit 134 is the same as the correction in ACT 204. However, the positioning control unit 134 may not perform skew correction if the reference color is changed and there is no tilt mirror 403 with respect to the reference color before the change. On the other hand, the positioning control unit 134 also performs skew correction with respect to the reference color if the reference color is changed and there is the tilt mirror 403 with respect to the reference color before the change.

If there is no change in the reference color in processing of ACT 205 (ACT 205: NO), the positioning control unit 134 performs processing of ACT 207.

According to the image forming apparatus 100 configured as described above, user convenience can be improved. Specifically, the image forming apparatus 100 changes the output direction of laser light if the laser light which is reference for image forming is not detected. As described above, if the laser light, of which an output direction is changed, is detected, printing operation of the apparatus does not stop. Accordingly, it is unlikely that a user cannot use the image forming apparatus 100. For this reason, operation is possible without the apparatus being stopped and user convenience can be improved even when an optical system of the LD 401 deforms due to a temperature change.

The image forming apparatus 100 further includes the tilt mirror 403 reflecting laser light and the tilt motor 405 changing the angle of the tilt mirror 403 by being driven. The tilt motor control unit 133 of the printer unit 130 changes the output direction of laser light by driving the tilt motor 405 and changing the angle of the tilt mirror 403. Consequently, the output of laser light can be changed.

In addition, the image forming apparatus 100 switches to another light source if laser light is not detected in a certain light source. Consequently, laser light detection probability can be improved.

In addition, the image forming apparatus 100 further includes the network interface 310 as a communication unit that notifies an external device, if the output direction of laser light is changed, that the output direction is changed. If the output direction of laser light is changed, there is a high possibility that an abnormality occurs in a source of laser light which is reference for image forming. The control of the angle of the tilt mirror 403 or switching between light sources in the embodiment is a life-prolonging measure for not stopping the apparatus. Since image forming apparatus 100 includes the communication unit and performs notification, components of the apparatus can be immediately replaced.

Hereinafter, a modification example of the image forming apparatus 100 will be described.

In a changed angle information table, a plurality of rotation information pieces may be registered for each of rotation information pieces with respect to the direction of (2) and the direction of (3). If such a configuration is adopted, the tilt motor control unit 133 changes the angle of the tilt mirror 403 according to the number of times the angle is changed. For example, the angle of the tilt mirror 403 is changed three or more times for one light source in one color.

According to at least one embodiment described above, improving user convenience is possible.

Some functions of the image forming apparatus 100 in the embodiment described above may be realized by a computer. In this case, a program for realizing the functions is recorded in a computer readable recording medium. The program described above may be realized by causing a computer system to read and execute the program recorded in the recording medium.

The "computer system" referred herein includes hardware such as an operating system and peripherals. The "computer readable recording medium" refers to a portable medium or a memory device. The portable medium includes a flexible disk, a magneto-optical disk, a ROM, and a CD-ROM. The memory device includes a hard disk mounted in a computer system. The "computer readable recording medium" dynamically maintains a program for a short period of time as in a communication line if the program is transmitted via a communication channel. The communication channel is a network, such as the Internet, and a telephone line. In addition, the "computer readable recording medium" may be a volatile memory inside a computer system which is a server or a client. The volatile memory temporarily maintains a program. In addition, the program may be a program for realizing some of the functions described above. The program may be combined with a program already recorded in a computer system and realize the functions described above.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image forming apparatus comprising:
    a laser device configured to emit laser light, which is reference for image forming, wherein the laser device includes a plurality of light sources, wherein the laser device includes the plurality of light sources arrayed in a sub-scanning direction;
    a mirror configured to reflect the laser light; and
    a motor configured to be driven and to change an angle of the mirror,
    a sensor configured to detect laser light emitted from the laser device; and
    a control unit configured to change an output direction of the laser light emitted from the laser device if the laser light is not detected by the sensor, and wherein the control unit changes the output direction of the laser light by driving the motor and changing the angle of the mirror and wherein if laser light from a certain light source out of the light source cannot be detected from the light source, which is an irradiation source of laser light, to another light source, and the output direction of the laser light is changed by changing the light source which is the reference for image forming.

2. The apparatus according to claim 1,
    wherein
    the control unit changes, if laser light from a light source, which is the reference for image forming, cannot be detected, the output direction of the laser light is changed by changing the light source which is the reference for image forming.

3. An image forming apparatus comprising:
    a laser device configured to emit laser light which is reference for image forming;
    a sensor configured to detect the laser light emitted from the laser device; and
    a control unit configured to change an output direction of the laser light emitted from the laser device if the laser light is not detected by the sensor,
    a mirror configured to reflect the laser light; and
    a motor configured to be driven and to change an angle of the mirror,
    wherein the control unit changes the output direction of the laser light by driving the motor and changing the angle of the mirror,
    the laser device includes a plurality of light sources,
    the control unit changes, if laser light from a light source, which is the reference for image forming, cannot be detected, the output direction of the laser light by changing the light source which is the reference for image forming,
    the laser device includes the plurality of light sources for each color of laser light, and
    the control unit switches, if laser light cannot be detected in all light sources in a certain color, from a light source, which is an irradiation source of laser light, to a light source in another color.

4. The apparatus according to claim 3, further comprising:
    a communication unit configured to notify, if the output direction of the laser light is changed by the control unit, an external device of the change.

5. The apparatus according to claim 3, further comprising:
    a memory unit configured to save, if the output direction of the laser light is changed by the control unit, the change in the output direction.

6. The apparatus according to claim 3, further comprising:
    a positioning control unit configured to control positioning based on the laser light detected by the sensor.

7. The apparatus according to claim 2,
    wherein the control unit also causes a light source, in which laser light cannot be detected, to emit light.

8. The apparatus according to claim 1, further comprising:
    a communication unit configured to notify, if the output direction of the laser light is changed by the control unit, an external device of the change.

9. The apparatus according to claim 1, further comprising:
    a memory unit configured to save, if the output direction of the laser light is changed by the control unit, the change in the output direction.

10. The apparatus according to claim 1, further comprising:
- a positioning control unit configured to control positioning based on the laser light detected by the sensor.

11. A laser light detecting method, comprising:
- emitting laser light which is reference for image forming from a plurality of light sources arrayed in a sub-scanning direction; and
- wherein a control unit changes an output direction of the laser light if the laser light is not detected and wherein the control unit switches, if laser light cannot be detected in all light sources in a certain color to a light source in another color.

\* \* \* \* \*